United States Patent [19]

Ota et al.

[11] 4,358,491

[45] Nov. 9, 1982

[54] PROCESS FOR PRODUCING A HOLLOW VESSEL HAVING A FROSTED GLASS-LIKE SURFACE

[75] Inventors: Akiho Ota, Funabashi; Masanori Nishikawa, Isehara; Masao Hattori, Hatano; Akio Tsuboi, Otsu; Yoshihisa Hama, Otsu; Tadashi Okudaira, Otsu; Shigeharu Sugihara, Otsu, all of Japan

[73] Assignees: Toyo Boseki Kabushiki Kaisha; Yoshino Kogyosho Co., Ltd., both of Japan

[21] Appl. No.: 937,699

[22] Filed: Aug. 29, 1978

[30] Foreign Application Priority Data

Aug. 29, 1977 [JP] Japan .................................. 52/103921

[51] Int. Cl.³ ........................ B65D 23/00; B29C 17/07
[52] U.S. Cl. ...................................... 428/35; 264/521; 264/532; 264/535
[58] Field of Search ............... 264/520, 521, 529, 530, 264/535, 537–543, 532; 215/1 C; 428/35

[56] References Cited

U.S. PATENT DOCUMENTS

| | | | |
|---|---|---|---|
| 3,733,309 | 5/1973 | Wyeth et al. | 264/539 X |
| 3,803,275 | 4/1974 | Corsover | 425/526 X |
| 3,822,332 | 7/1974 | Hrach et al. | 264/537 |
| 3,900,120 | 8/1975 | Sincock | 215/1 C |
| 4,164,298 | 8/1979 | Nishikawa et al. | 264/521 X |

FOREIGN PATENT DOCUMENTS

2713879 10/1977 Fed. Rep. of Germany ...... 215/1 C

*Primary Examiner*—Jan H. Silbaugh

[57] ABSTRACT

A process for producing a hollow vessel having a frosted glass-like surface which comprises molding a crystalline thermoplastic polyester copolymer comprising units of ethylene terephthalate as the main component into a transparent parison, crystallizing at least the surface layer portion of the parison and then subjecting it to blow molding.

6 Claims, No Drawings

PROCESS FOR PRODUCING A HOLLOW VESSEL HAVING A FROSTED GLASS-LIKE SURFACE

The present invention relates to a process for producing a hollow vessel, particularly having a frosted glass-like (or opalescent) appearance, from a crystalline thermoplastic polyester copolymer comprising units of ethylene terephthalate as the main component.

Thermoplastic polyesters comprising units of ethylene terephthalate have hitherto been widely utilized as package materials in processed forms such as vessels, films and sheets owing to their excellent properties such as transparency, gas barrier property, moisture barrier property, fragrance-preserving property and sanitariness as well as their high mechanical properties. In recent days, their utilization in the field of hollow vessels whose representative examples are bottles and cans is particularly notable due to improvement of techniques for blow molding.

However, as apparent from the descriptions in U.S. Pat. No. 3,733,309, the characteristic feature of conventional hollow vessels made of thermoplastic polyesters has been present in the preservative function and transparency based on the said properties inherent to polyesters, and decorative factors as required for vessels for cosmetics have almost been disregarded. Thus, such vessels have been taken, in usual, only as lower grade goods like other plastic vessels.

A main object of the present invention is to provide a hollow vessel having a frosted glass-like surface from a thermoplastic polyester. Another object of this invention is to provide a process for producing a hollow vessel having a decorative appearance without deterioration of various advantageous properties inherent to thermoplastic polyesters. A further object of the invention is to provide a hollow vessel of a thermoplastic polyester shaped, even by the use of a mold having a complicated form with angles, into a form completely corresponding to that of the mold.

According to the present invention, there is provided a process for producing a hollow vessel which comprises molding a crystalline thermoplastic polyester copolymer comprising units of ethylene terephthalate as the main component and having an intrinsic viscosity of 0.5 or more into a transparent parison, crystallizing at least the surface layer portion of the parison and then subjecting it to blow molding at a temperature at which biaxial stretching or expansion is realizable.

A conventional process for production of hollow vessels of thermoplastic polyesters comprises forming a transparent, closed-end parison by injection or extrusion molding, heating the parison at a temperature at which biaxial stretching or expansion is realizable while preventing crystallization of the parison and effecting blow molding at this temperature. In the process of this invention, a transparent, closed-end parison, obtained by injection or extrusion molding, is crystallized at the surface layer portion, for instance, by heating to such an extent that clear whitening of the surface layer portion is observed macroscopically, and then blow molded at a temperature at which biaxial stretching or expansion is realizable. Thus, the process of this invention is highly characteristic in carrying out blow molding of a parison after its crystallization at the surface layer portion.

In the process of the invention, a crystalline thermoplastic polyester copolymer comprising units of ethylene terephthalate as the main component is used as the starting material for manufacture of a parison. The parison of such polyester copolymer has an appropriate rate of crystallization, and its degree of crystallization can be readily controlled so that the constant extent of crystallization at the surface layer portion is reproducible with ease. Further, after the surface layer portion is crystallized, the parison is still readily stretchable by blow molding, and shaping into a desired form can be easily achieved. Therefore, even if a complicatedly designed hollow vessel with angles is aimed at, such vessel involving the angle portions can be readily and precisely reproduced from the corresponding mold.

When any other thermoplastic polyester such as polyethylene terephthalate is used for the manufacture of a parison, the crystallization rate may not be appropriate so that the control of the degree of crystallization is difficult. Because of this reason, the production of an article of desired shape from the parison after crystallization at the surface layer portion by blow molding will be hardly possible.

For measurement of the crystallization rate, the differential scanning calorimeter method (hereinafter referred to as "DSC method") in which the thermal behavior of a crystalline polymer is determined is widely adopted. According to this method, the thermal changes of the polymer during the elevation or lowering of the temperature are caught electrically and recorded on a graph, and thus the changes of the specific heat are immediately expressed on the graph. When the polymer in a non-crystalline state is crystallized, an exothermic peak is recorded, and the peak temperature at this point is regarded as the crystallization temperature. There are two kinds of crystallization temperature, of which one is a temperature at which crystallization takes place when a substantially non-crystalline polymer is heated from room temperature, and the other is a temperature at which crystallization takes place when a crystalline polymer is melted into a non-crystalline state at an elevated temperature and then gradually cooled. The former is called the "crystallization temperature in the course of temperature elevation" and the latter is called the "crystallization temperature in the course of cooling". The crystallization temperature in case of crystallizing the transparent parison under heating in the process of this invention corresponds to the former one. When the crystallization temperature in the course of temperature elevation according to the DSC method is high or hardly observed, the crystallization at heating of the parison occurs slowly.

The polyester copolymer to be used in the invention is preferred to be such that, when the specimen (10 mg) of a parison molded therefrom is kept at a temperature higher than its melting point by 40° C. for 5 minutes and then cooled rapidly to room temperature to obtain a sample in a substantially non-crystalline state, which is then subjected to temperature elevation from room temperature at a rate of 20° C./min, the crystallization temperature determined by the DSC method is hardly detected, or is proved to be higher than 140° C., preferably higher than 150° C. In case of polyethylene terephthalate, a clear crystallization peak is observed usually at 140° C. or lower, the crystallization occurring quickly, and especially the conditions for attaining adequate crystallization of the surface layer of the parison are limited to a narrow range. Thus, a uniform frosted-glass like surface can not be obtained or complete shaping precisely corresponding to the form of the mold is difficult.

The polyester copolymer to be used in the invention comprises units of ethylene terephthalate as the main component and units of one or more copolymerizable compounds. Examples of such copolymerizable compounds are dicarboxylic acids (e.g. isophthalic acid, adipic acid, sebacic acid, naphthalenedicarboxylic acid, diphenoxyethanedicarboxylic acid, hexahydroterephthalic acid), diols (e.g. trimethylene glycol, tetramethylene glycol, neopentyl glycol, hexamethylene glycol, cyclohexanedimethanol, diethylene glycol, 2,2-bis(4-hydroxyphenyl)propane, 2,2-bis(4-hydroxyethoxyphenyl)propane, polyethylene glycol, polypropylene glycol, polytetramethylene glycol), hydroxycarboxylic acids (e.g. p-hydroxybenzoic acid, p-hydroxyethoxybenzoic acid), etc. Usually, these copolymerizable compounds have a molecular weight of not more than 2,000. Particularly preferred are isophthalic acid and neopentyl glycol.

The proportion of the ethylene terephthalate units to the total amount of the polyester copolymer is from 70 to 97 mol%, preferably from 80 to 95 mol%, more preferably from 85 to 95 mol%. When the amount of the ethylene terephthalate units is smaller than 70 mol%, not only the rate of the crystallization of the transparent parison becomes too small, but also the mechanical properties and the chemical resistance of the hollow vessel as ultimately produced are deteriorated. When the amount is larger than 97 mol%, the effect of the copolymerization is reduced and the rate of the crystallization becomes too large, the same disadvantages as in case of polyethylene terephthalate being thus produced. In any event, the proportion of the units of the copolymerizable compounds to the total weight of the polyester copolymer should not exceed 20% by weight; otherwise, the thermal resistance will be considerably decreased.

The intrinsic viscosity of the polyester copolymer of the invention is 0.5 or more when determined at 30° C. in a solvent mixture of phenol and tetrachloroethane (3:2 by weight). When the intrinsic viscosity is less than 0.5, the mechanical strength will be insufficient. The intrinsic viscosity is not limitative on its upper value, but it is usually not more than 1.3. A preferred range of the intrinsic viscosity is from 0.6 to 1.0.

Preparation of the closed-end parison may be effected by a per se conventional procedure such as injection molding or extrusion molding. It is important for facility of the blow molding in the subsequent step to make the parison transparent. Insofar as the polyester copolymer as stated above is used, the produced parison is substantially transparent irrespective of its thickness. For realization of a high transparency with ease, the core and the cavity of the mold in a molding machine are favored to be kept at a temperature as low as possible so that the melted resin as injected is rapidly cooled and solidified in the mold. In case of using polyethylene terephthalate, however, a thick parison is susceptible to crystallization and, even when the above procedure for injection molding is adopted, a transparent one is hardly obtainable. The limit of the thickness for obtaining a transparent parison from polyethylene terephthalate having an intrinsic viscosity of 0.5 to 1.0 is from 4 to 5 mm. Since the thickness of the parison is rather to be determined depending on the thickness of a shaped product as ultimately obtainable, the said limitation on the thickness of the parison puts disadvantageously a considerable restriction on the thickness and, therefore, the design of a shaped product to be ultimately manufactured.

In the process of the invention using the polyester copolymer as above defined, there is no particular limitation on the thickness of the parison. In usual, a thickness of 1 to 15 mm, particularly 2 to 10 mm, is preferred. In case of a thickness smaller than 1 mm, the hollow vessel obtained after the blow molding is almost of no commercial value. In case of a thickness larger than 15 mm, an extremely high blow pressure is required for stretching by blow molding after crystallization of the parison, and complete shaping precisely corresponding to the form of the blow mold becomes difficult. The density of the transparent, closed-end parison is desired to be 1.345 or less. When it exceeds 1.345, the middle layer of the parison is apt to become opaque, which may cause uneven crystallization or give a restriction in designing.

The transparent closed-end parison whose upper end is open, obtained usually by injection or extrusion molding, is then crystallized for whitening. Such crystallization may be effected, for instance, by heating in an oven. In the oven which contains as the thermal source a heat-generator such as an infrared heater or a block heater, there is a spindle moving under rotation, with which the orifice of the closed-end parison is combined and thus made to pass through the oven under rotation so as to promote the crystallization from the external surface layer of the parison. It is favorable to attain the crystallization of the parison to such an extent that the average density of the portion from the external surface to the depth of 1 mm becomes in the range of 1.345 to 1.375, preferably of 1.348 to 1.369. In case of the density being smaller than 1.345, whitening due to the crystallization is scarcely caused. In case of the density being larger than 1.375, the crystallization is progressed excessively and precise shaping corresponding to the form of the mold at the subsequent blow molding is difficult. The crystallization of the parison may be effected in such a manner that the whole layer from the external surface to the inner surface shows a density being in the said range, but it is usually desirable to crystallize the parison from its external surface under heating so as to obtain the said average density in the portion from the external surface to the depth of at least 1 mm and to make a density gradient from the external surface layer to the inner layer. For attaining adequate crystallization of the surface layer, the temperature and the time for the heating of the parison may be optionally determined. For this purpose, it is preferable to use an apparatus in which the voltage of the heater, the distance between the spindle and the heater, the rotation speed of the spindle and the moving speed of the spindle in the oven can be optionally changed. The temperature at the heating of the surface of the parison for its crystallization is desired to be lower than the melting point of the crystalline polyester copolymer by 20° C. or more, although it must be sufficient to accomplish the crystallization.

In the process of the invention, the parison is not necessarily required to be crystallized at the whole surface, but partial crystallization is also included in the scope of the invention. For example, when it is desired to keep in a transparent state only the orifice and neck portions which correspond to the upper part of the hollow vessel and to give a frosted glass-like appearance to the trunk portion alone which corresponds to the lower part of the hollow vessel by crystallization under heating, a heat-intercepting plate is provided between the spindle and the heat-generator as far as the position corresponding to the orifice and neck portions of the parison passing through the heating oven so that heat may not be given directly to the orifice and neck portions. In short, the portion which is desired to retain the transparency is subjected to heat-interception or compulsory cooling.

In the subsequent step for blow molding, the parison crystallized at the whole surface or specific portion is stretched under blowing with a compressed gas such as air or nitrogen, if necessary by the aid of a stretching rod, in a blow mold having a desired form to obtain a molded hollow vessel. The parison immediately before the blow stretching should have a temperature at which stretching is realizable, i.e. a temperature lower than the melting point (Tm) and higher than the glass transition point (Tg), preferably in the range from (Tg+10° C.) to (Tm−20° C.).

The term "density" used in the invention is intended to mean a value (g/ml) obtained by determination at 30° C. by the aid of a density-gradient tube of calcium nitrate-water system.

The polyester copolymer to be molded in the invention may contain conventional additives such as coloring agents, pigments, antistatic agents, ultraviolet ray absorbents, oxidation-deterioration inhibitors and releasing agents. Blending or lamination with other thermoplastic resins may be also effected insofar as the effect of the invention is not reduced.

The present invention will be hereinafter explained further in detail by the following Examples wherein parts are by weight.

EXAMPLE 1

A mixture of dimethyl terephthalate (89 parts), dimethyl isophthalate (11 parts) and ethylene glycol (70 parts) is heated at 140° to 230° C. for 2.5 hours in the presence of manganese acetate (0.028 part) and germanium dioxide (0.024 part) in nitrogen atmosphere to effect ester exchange, during which the by-produced methanol is distilled out from the reaction system. To the reaction product, trimethyl phosphate (0.042 part) is added, and the mixture is stirred for 10 minutes. Then, the pressure of the reaction system is gradually reduced while elevating the temperature slowly to obtain a final condition of 0.5 mmHg and 260° C., under which polymerization is carried out for about 2 hours. After completion of the polymerization, the product is cut into granules (3.4 mm×3.4 mm×4.0 mm) in water. The thus obtained polyester copolymer shows an intrinsic viscosity of 0.75. By measurement according to the DSC method, the melting point is proved to be 230° C., and the crystallization peak in the course of temperature elevation is not seen.

This polyester copolymer is subjected to injection molding by the aid of an injection molding machine N-95 manufactured by Nihon Seiko K. K. under the following conditions: cylinder temperature, 250° C.-260° C.-270° C. (from the hopper side); injection pressure, 60 kg/cm$^2$ (as gauge pressure); mold temperature, 25° C. Thus, a transparent closed-end parison having an inner diameter of 16 mm, an outer diameter of 22 mm, a thickness of 3 mm and a length of 120 mm is obtained. The density is 1.340.

Then, whitening under heating and blow molding are effected by the aid of a stretching blow molding machine which comprises a heating oven portion having an infrared heater, a stretching blow portion having a stretching rod, a spindle serving also as a blower of compressed gas and a blow mold and a driving portion for operating them.

The transparent parison obtained by the injection molding is set up to the spindle of the stretching blow molding machine and placed, in a rotary state, in the heating oven portion to effect whitening by crystallization under heating. The degree of the crystallization indicated by the density is shown in Table 1.

TABLE 1

| Run No. | Time for heating at 180° C. (min) | Average density of surface layer portion of parison from its external surface up to depth of 1 mm | Appearance of surface of parison |
|---|---|---|---|
| 1 | 2 | 1.342 | Transparent |
| 2 | 4 | 1.349 | Milky white |
| 3 | 5 | 1.353 | Milky white |
| 4 | 8 | 1.360 | Milky white |
| 5 | 15 | 1.378 | Milky white |

The parison, heated in Run No. 2, is transferred to the stretching blow portion and stretched with blowing in the blow mold under a compressed gas pressure of 10 kg/cm$^2$ or more and a stretching rod oil pressure of 40 kg/cm$^2$. The thus obtained hollow vessel has an orifice-neck portion being 22 mm in outer diameter, 16 mm in inner diameter and 25 mm in length, and a stretched trunk portion being 50 mm in outer diameter, about 48 mm in inner diameter and 80 mm in length. Thus, a hollow vessel having a shape completely corresponding to that of the blow mold is obtained with good reproducibility.

The surface of the hollow vessel has a characteristic pale milky white, frosted glass-like appearance, which can not be obtained by the use of a pigment or a coloring agent, and gives a soft taste.

EXAMPLES 2 AND 3

The production of hollow vessels is effected in the same manner as in Example 1 but adopting the heating condition in Run No. 3 or 4 of Table 1. There are obtained hollow vessels having a shape completely corresponding to that of the blow mold with good reproducibility without formation of disqualified products. The hollow vessels have a beatiful milky white, frosted glass-like surface.

COMPARATIVE EXAMPLE 1

The blow molding is effected in the same manner as in Example 1 but adopting the heating condition in Run No. 5 of Table 1. Sufficient shaping completely corresponding to the form of the blow mold is not attained. This is probably attributable to insufficient stretching due to the too large density of 1.378 on heating of the parison, i.e. due to the excessive progress of crystallization.

COMPARATIVE EXAMPLE 2

Using polyethylene terephthalate having an intrinsic viscosity of 0.8, a transparent parison having the same shape as in Example 1 is prepared by injection molding by the aid of an injection molding machine N-95 manufactured by Nihon Seiko K. K. under the following conditions: cylinder temperature, 270° C.-290° C.-290° C. (from the hopper side); injection pressure, 60 kg/cm$^2$ (as gauge pressure); mold temperature, 20° C. The density of the thus obtained parison is 1.341. The parison is then crystallized under heating at the heating oven portion in the stretching blow molding machine at 180° C. as in Example 1 and subjected to blow molding. The results are shown in Table 2.

TABLE 2

| Time for heating at 180° C. (min) | Denstiy of surface layer portion of parison | Estimation of stretching blow molding (Rate of disqualification at shaping, %) |
|---|---|---|
| 1 to 2 | 1.345–1.360 | 30 |
| 2 to 3 | 1.360–1.375 | 80 |

As apparent from the results, not only the conditions for crystallization under heating to obtain a frosted glass-like surface are restricted to a narrow range, but also disqualified products in which shaping completely corresponding to the form of the mold can not be attained or a uniform, frosted glass-like surface can not be obtained are frequently formed at shaping. Further, in case of the blow molding of hollow vessels having a complicated form with angles, the shaping of the angle portions can not be effected.

EXAMPLE 4

Using the polyester copolymer as employed in Example 1, a transparent closed-end parison is prepared by injection molding using an injection molding machine N-95 manufactured by Nihon Seiko K. K. under the following conditions: cylinder temperature, 260° C.-280° C.; injection pressure, 50 kg/cm² (as gauge pressure); mold temperature, 20° C. The thus obtained parison has a total length of 95 mm, an orifice-neck portion being 15 mm in inner diameter and 22 mm in outer diameter and a trunk portion as the side wall of a bottle to be ultimately produced being 27 mm in outer diameter. Thus, the thickness of the trunk portion is 6 mm. The density of the parison is 1.342.

The parison is then set up to the spindle of the stretching blow molding machine and introduced into the heating oven portion equipped with an infrared heater. In the heating oven portion, a heat-intercepting plate having a length sufficient for covering the orifice-neck portion of the parison is provided between the spindle and the infrared heater so that the orifice-neck portion is prevented from heating. In this condition, the spindle is rotated, and the trunk portion which is not protected from heat is heated at 180° C. for 4 minutes. The thus heated trunk portion of the parison is whitened at the layer from the external surface up to the depth of about 3 mm. The average density of the surface layer portion from the external surface to the depth of 1 mm is 1.350. The density of the orifice-neck portion not heated is 1.343.

The parison is then transferred to the blow mold, and blow molding is effected under a pressure of 10 kg/cm² or more with a compressed gas introduced from a compressor while stretching in axial direction at a rate of 4% by the aid of a stretching rod. The thus obtained bottle has a form completely corresponding to that of the blow mold; the total length being 99 mm. The length from the orifice to the neck is 27 mm, and the outer diameter and the inner diameter of this portion are respectively 22 mm and 15 mm. The outer diameter and the thickness of the trunk portion are respectively 52 mm and 1.8 mm. The effective volume is 130 ml. In this bottle, the orifice-neck portion which is protected from heating is transparent, and the trunk portion has a frosted glass-like appearance.

When polyethylene terephthalate is employed as the material, the production of a hollow vessel as above is impossible, because a transparent parison having a trunk portion of 6 mm in thickness is not obtainable.

EXAMPLE 5

A mixture of dimethyl terephthalate (100 parts), ethylene glycol (60 parts) and neopentyl glycol (10 parts) is heated at 140° to 230° C. for 2⅔ hours in the presence of manganese acetate (0.028 part) and germanium dioxide (0.024 part) in nitrogen atmosphere to effect ester exchange, during which the by-produced methanol is distilled out from the reaction system. To the reaction product, trimethyl phosphate (0.042 part) is added, and the mixture is stirred for 10 minutes. Then, the temperature of the reaction system is gradually elevated while reducing the pressure slowly to obtain a final condition of 280° C. and 0.2 mmHg, under which polymerization is carried out for 2⅓ hours. After completion of the polymerization, the product is cut into granules (3.4 mm × 3.4 mm × 4 mm) in water. The thus obtained polyester copolymer shows an intrinsic viscosity of 0.72. By measurement according to the DSC method, the melting point is proved to be 236° C., and the crystallization peak in the course of temperature elevation is not seen.

This polyester copolymer is subjected to injection molding by the aid of an injection molding machine N-95 manufactured by Nihon Seiko K. K. under the following conditions: cylinder temperature, 250° C.-265° C.-270° C. (from the hopper side); injection pressure, 40 kg/cm² (as gauge pressure); mold temperature, 20° C. The mold used for injection molding is the same as in Example 1. The thus obtained transparent parison has a density of 1.339.

The parison is transferred to a biaxial stretching blow molding machine as used in Example 1 and whitened by heating at 190° C. for 4 minutes in the heating oven portion. The resulting parison, of which the density of the surface layer from the external surface to the depth of 1 mm is 1.350, is then transferred to the stretching blow portion and subjected to biaxial stretching blow molding as in Example 1. The thus obtained hollow vessel has an excellent appearance with a uniform milky white, frosted glass-like surface. Also in the blow molding of hollow vessels having a complicated form with angles, excellent products having a characteristic milky white, frosted glass-like surface can be obtained, disqualified products being not prepared.

What is claimed is:

1. A process for producing a hollow vessel having a frosted glass-like surface which comprises molding a crystalline thermoplastic polyester copolymer comprising 80 to 95 mole % of ethylene terphthalate units and 20 to 5 mole % of units selected from the group consisting of isophthalic acid, neopentyl glycol and mixtures thereof, said polyester copolymer having an intrinsic viscosity of not less than 0.5, into a transparent parison, crystallizing at least the surface layer portion of the parison and then subjecting it to blow molding at a temperature at which biaxial stretching or expansion is realizable.

2. The process according to claim 1, wherein the polyester copolymer has an intrinsic viscosity of from 0.6 to 1.0.

3. The process according to claim 1, wherein the crystallization is effected by heating.

4. The process according to claim 1, wherein the crystallization is effected until the average density of the surface layer from the external surface to the depth of at least 1 mm is in a range of 1.345 to 1.375.

5. The process according to claim 1, wherein the surface of the parison is crystallized partially.

6. A hollow vessel having a frosted glass-like surface, produced by the process according to claim 1.

* * * * *